United States Patent
Pan et al.

(10) Patent No.: US 7,307,370 B2
(45) Date of Patent: Dec. 11, 2007

(54) LONG-STROKE, HIGH-RESOLUTION NANOPOSITIONING MECHANISM

(75) Inventors: Shan-Peng Pan, Jhubei (TW); Wei-Cheng Chang, Sijhih (TW); Bin-Cheng Yao, Taipei (TW)

(73) Assignee: Industrial Technology Research Institute (TW)

( * ) Notice: Subject to any disclaimer, the term of this patent is extended or adjusted under 35 U.S.C. 154(b) by 364 days.

(21) Appl. No.: 11/080,437

(22) Filed: Mar. 16, 2005

(65) Prior Publication Data

US 2005/0269915 A1 Dec. 8, 2005

(30) Foreign Application Priority Data

Jun. 3, 2004 (TW) .............................. 93115960 A

(51) Int. Cl.
*H01I 41/08* (2006.01)
(52) U.S. Cl. ................................................. 310/328
(58) Field of Classification Search ............... 310/328, 310/317, 316, 323.01, 323.02, 323.03, 346; 73/105; 74/470
See application file for complete search history.

(56) References Cited

U.S. PATENT DOCUMENTS 4,727,278 A * 2/1988 Staufenberg et al. ....... 310/328
7,196,454 B2 * 3/2007 Baur et al. ............. 310/323.01

* cited by examiner

*Primary Examiner*—Darren Schuberg
*Assistant Examiner*—Karen Addison
(74) *Attorney, Agent, or Firm*—Bacon & Thomas, PLLC

(57) ABSTRACT

The present invention relates to a long-stroke nanopositioning device, comprising: a piezoelectric tube; a quartz glass rod; two fixed seats being disposed on the ends of the piezoelectric tube and a piezoelectric actuator. Each of the fixed seats has a base for receiving at least one spring and a plurality of ruby balls. The quartz glass rod is gripped to the fixed seat by the ruby balls of the fixed seat wherein the gripping force is controlled by means of the spring. The piezoelectric actuator applies an input voltage to the piezoelectric tube to cause one end of the piezoelectric tube to have a relative displacement in a direction along the axis of the quartz glass rod. The present invention provides a nanopositioning device capable of long stroke displacements at the nanometer scale by controlling the input voltage of the piezoelectric actuator and the gripping force of the ruby balls.

18 Claims, 3 Drawing Sheets

LONG-STROKE, HIGH-RESOLUTION NANOPOSITIONING MECHANISM

BACKGROUND OF THE INVENTION

1. Field of the Invention

The present invention relates to a nanopositioning device and a fixed seat made of piezoelectric material thereof, and more particularly, to a long-stroke nanopositioning device and a fixed seat made of piezoelectric material thereof.

2. Description of Related Art

Due to the various properties of the nanostructured materials all vary with the materials' grain sizes, the various unique properties of the nanostructured materials have gradually attracted technicians' attention in the field. The main characteristics of the nanomaterials with nanostructures are as follow: Firstly, the nanostructure of a nanomaterial formed in either crystalline phase or amorphous phase is much different from that of the corresponding bulk material. Secondly, the various properties of the nanomaterials such as optical properties, magnetic properties, heat-transfer properties, diffusion properties and machinery properties are different from those of the corresponding bulk material. Thirdly, metals or polymers that cannot be blended in their bulk phase can now be blended to form an alloy in their nanostructure phase. The nanostructured materials have several chemical and physical properties such as material strength, modulus, ductility, wear and tear resistance, magnetic properties, superficial catalytic properties and erosion behavior that vary in accordance with the grain size thereof. Due to the novel, interesting and valuable characteristics described above, the nanostructured materials have been developed to provide their new functions in different application fields.

With the development of micro-scanning technology, the analysis and identification technology of the nanomaterials develop accordingly. The microscopes in the micro-scanning technology includes the High Resolution Transmission Microscope (HRTM) capable of scanning in the atom order resolution, the Scanning Tunneling Microscope (STM), the Atomic Force Microscope (AFM), and the Magnetic Force Microscope (MFM) capable of observing the structural arrangement of the atoms on the surface of the observed object.

However, the nanometer scaled displacements of the moving plates for these microscopes are all limited, and the cost the moving plates are extremely expensive. For example, when studying the structure of the probing head of the miniature Scanning Electron Microscope (SEM), the probe tip of the Scanning Tunneling Microscope (STM) is necessary to have three-dimensional nanometer scaled displacements and scanning simultaneously. However, due to the problems such as the over-sized modules and the nanometer scaled displacements can only be achieved by alternatively tuning the microscopes, the commercial nanopositioning systems of the present time cannot providing the nanometer scaled displacements within a long stroke range.

The present invention can overcome the aforesaid drawbacks of the commercial nanopositioning systems of the present time and provide a long stroke, nanometer scaled displacement with a lower cost.

SUMMARY OF THE INVENTION

It is an object of the present invention to provide a long-stroke nanopositioning device so as to actuate nanometer scaled displacements in one-dimensional, two-dimensional nanometer and three-dimensional. It not only overcomes the drawbacks of the commercial nanopositioning mechanisms of the present time, but also provides a long stroke, nanometer scaled displacement of a minute probe tip. Besides, due to its simple and less-complex structure, the manufacturing cost of the nanopositioning device of the present invention can be much lower than the commercial nanopositioning mechanisms of the present time.

Another object of the present invention is to provide a fixed seat for a long-stroke nanopositioning device so as to actuate nanometer scaled displacements. It overcomes the drawbacks of the commercial nanopositioning mechanisms of the present time. Besides, due to the adjustable force, the resolution of the nanometer-scaled displacements can be easily adjusted.

To attain the objects, a long-stroke nanopositioning device according to the present invention comprises: a piezoelectric tube, a rod penetrating the piezoelectric tube without contacting with the piezoelectric tube, two fixed seats and a piezoelectric actuator. The two fixed seats connect to the two ends of the piezoelectric tube respectively, each of the fixed seats having at least one spring, a plurality of balls and a base with a plurality of fixing apertures, wherein each of the fixing apertures receives a ball that is sandwiched between the rod and the spring, at least one the fixing apertures receives one spring, the fixed seats grip the rod with the balls. The piezoelectric actuator applying an input voltage to the piezoelectric tube to cause one end of the piezoelectric tube to have a relative displacement in a direction along the axis of the rod.

To attain the object, a fixed seat for long-stroke nanopositioning devices cooperating with a piezoelectric tube having two ends, a rod penetrating the piezoelectric tube and an actuator applying an input voltage to the piezoelectric tube, comprises: a base, a plurality of balls and at least one spring. The base has a plurality of fixing apertures and at least one movable span wherein the rod penetrating the base, the fixing apertures and the at least one movable aperture are at the side face of the base which is in contact with the rod. The balls are received in the fixing apertures and the movable span respectively. The least one spring is disposed in the movable span and the ball is sandwiched between the at least one spring and the rod; wherein the rod is sandwiched among the plurality of balls and the gripping force of the plurality of balls on the rod is controlled by adjusting the elastic force of the spring.

In a fixed seat for the long-stroke nanopositioning devices according to the present invention, the material of the base is selected from those that can resist high temperature and high pressure without any deformation. Preferably, the base is made of a ceramic material. The rod and the balls being in contact with the rod should have smooth surfaces and lower friction force. Preferably, the rod is a quartz glass rod and the ball is made of ruby. In the present invention, the method of the fixed seat to grip the rod makes use of at least three balls to ensure that the rod contacts merely with the balls. In the simplified case, the balls are arranged outside the rod in a shape of triangle and the spring is used primarily for controlling the gripping force of the balls on the rod. Therefore, in the aforesaid simplified case, only one of the ball's gripping forces is required to be adjusted (i.e., the elastic force of the spring). The method for adjusting the balls' gripping forces is not limited. Preferably, a screw is used against the spring at one end of the movable span so as to control the volume of the movable span that the spring is occupied. Preferably, the screw further comprises a plug contacting with the spring and thus applies a uniform force on the spring.

In a long-stroke nanopositioning device according to the present invention, the piezoelectric tube is made of lead zirconium titanate. In a long-stroke nanopositioning device according to the present invention, the rod can be fixed so that the piezoelectric tube can be mounted on it; or alternatively, the rod can be a set of fixed seats so that the rod has a nanometer scaled displacement. When the rod is fixed, a probe tip or a movable plate can be mounted on the set of fixed seats. Alternatively, when the set of fixed seats is fixed, a probe tip or a movable plate can be mounted on the rod in order to control the position of the probe tip or the scanning plate.

When the long-stroke nanopositioning device is used for a horizontally driving system, the movable plate is supported by a base plate having a plurality of V-shaped quartz guided grooves as to reduce friction in movement and by this way to achieve the nanometer scaled displacements of the movable plate. The long-stroke nanopositioning device of the present invention may be combined with any other nanopositioning devices of the present time to have bi-axial or tri-axial movements, such as the movements in the X-Y-Z coordinate systems or even in the arcuate coordinate systems.

Other objects, advantages, and novel features of the present invention will become more apparent from the following detailed description when taken in conjunction with the accompanying drawings.

DETAILED DESCRIPTION OF THE PREFERRED EMBODIMENT

Three preferred embodiments of the present invention will be described hereinafter with reference to the accompanying drawings for illustrating the present invention.

Embodiment One

Three-dimensional Long-stroke Nanopositioning Device

Figure 1:
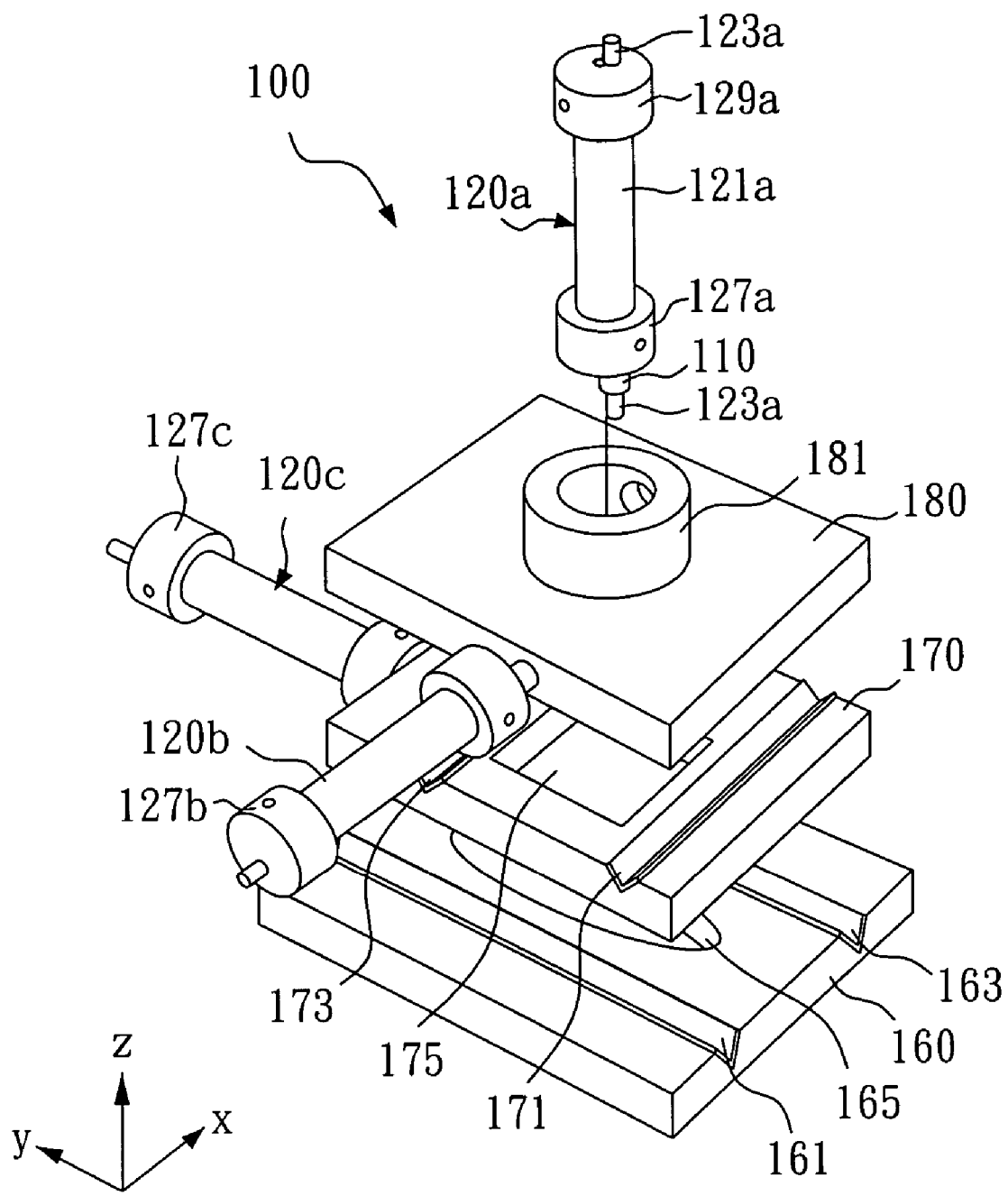
FIG. 1 is a schematic view of a preferred embodiment of a three-dimensional long-stroke nanopositioning device according to the present invention.
Figure 2:
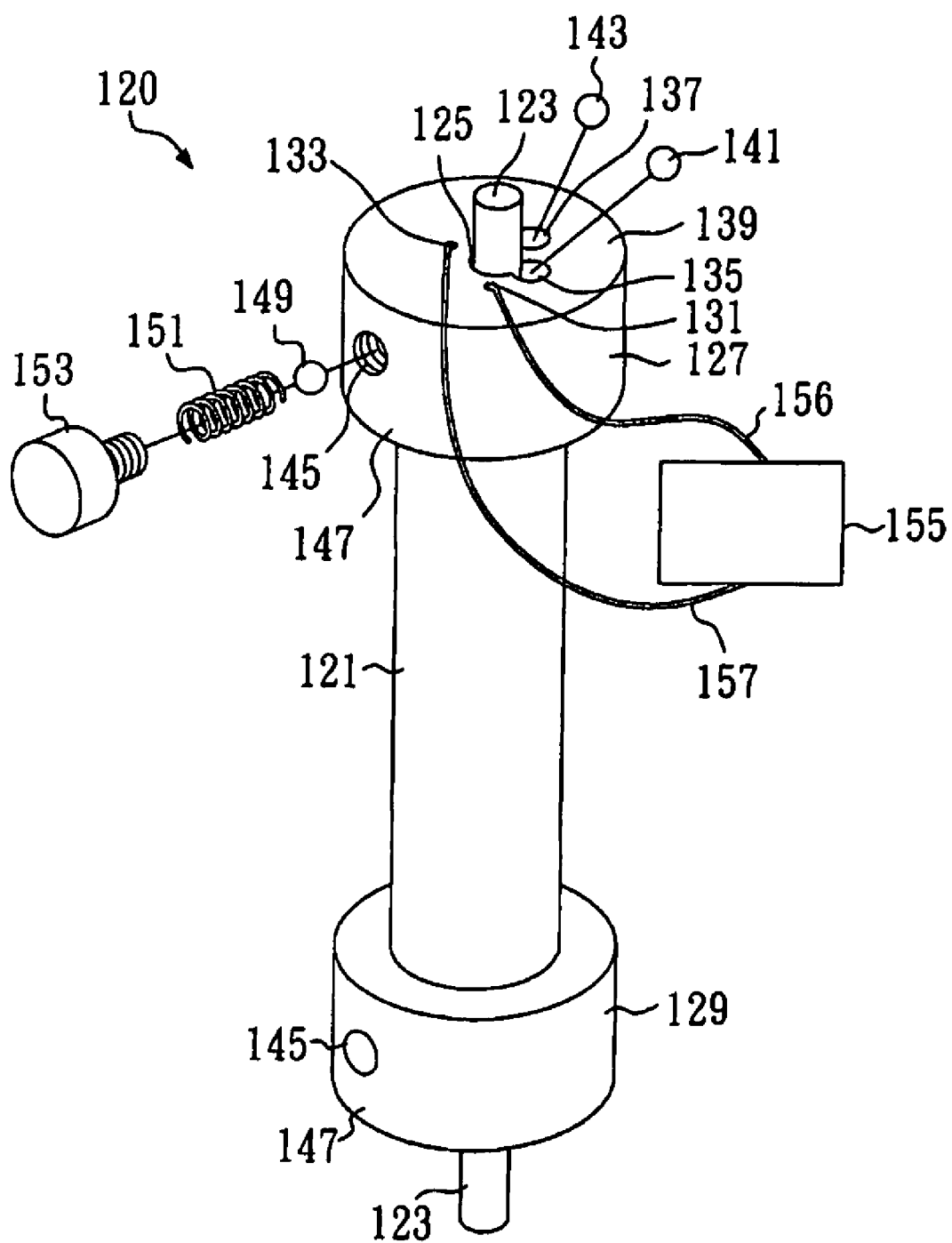
FIG. 2 is a schematic view of a preferred embodiment of a PZT fixed seat for a three-dimensional long-stroke nanopositioning device according to the present invention.

In this embodiment, a long-stroke nanopositioning device 100 is shown in FIG. 1, which can overcome the drawbacks of the present nanopositioning mechanisms such as movements within a small range. A STM probe tip 110 is positioned on the quartz glass rod 123a of the long-stroke nanopositioning device 100 with long stroke, nanometer scaled displacements. The long-stroke nanopositioning device 100 has three nanopositioning units 120b, 120c and 120a in the X-axis, Y-axis and Z-axis directions respectively. A nanopositioning unit 120 as shown in FIG. 2 comprises a cylindrical PZT tube 121, two ceramic fixed seats 127 and 129 and wires 156 and 157. The cylindrical PZT tube 121 has a central hole 125 that is penetrated by a quartz glass rod 123. The ceramic fixed seats 127 and 129 are fixed to the two ends of the cylindrical PZT tube 121 respectively. The wires 156 and 157 connect the cylindrical PZT tube 121 with the external PZT actuator through the apertures 131 and 133 of the ceramic fixed seat 127 respectively and apply an input voltage to the cylindrical PZT tube 121 to cause a relative displacement along the axis of the quartz glass rod of the cylindrical PZT tube 121. The ceramic fixed seat 127 (129) has two recesses 135 and 137 on the front face 139 of the ceramic fixed seat 127 for holding ruby balls 141 and 143 of $\Phi$ mm, respectively. In addition to the central hole 125 penetrated by the quartz glass rod, the ceramic fixed seat 127 (129) has a movable span 145 penetrating the ceramic fixed seat 127 (129) from the side face 147 thereof to the central hole 125. The movable span 145 receives a ruby ball 149 of $\Phi$ mm, and a 1 mm spring 151 compressed by a bolt 153. Therefore, the quartz glass rod 123 will be slightly gripped by the three ruby balls 141, 143 and 149. By adjusting the position of the bolt 153, the gripping force on the quartz glass rod 123 can be controlled.

As shown in FIG. 1, the long-stroke nanopositioning device 100 comprises a base 160 and a movable plate 170. The base 160 has V-shaped quartz glass guided grooves 161 and 163 along the Y-axis. The movable plate 170 is mounted on the base 160 and connected to the quartz glass rod of the nanopositioning unit 120c that is movable along the Y direction. The nanopositioning unit 120c has a ceramic fixed seat 127c that is connected to a mass block (not shown) to fix the ceramic fixed seat 127c in position. The movable plate 170 has V-shaped quartz glass guided grooves 171 and 173 along the X direction. A movable plate 180 is mounted on the moveable plate 170 and connected to the quartz glass rod of the nanopositioning unit 120b that is movable along the X direction. The nanopositioning unit 120b has a ceramic fixed seat 127b that is connected to a mass block (not shown) to fix the ceramic fixed seat 127b in position. A cylinder 181 having inner threads is mounted above the movable plate 180 in order to lock the ceramic fixed seat 127a of the nanopositioning unit 120a to the movable plate 180. Corresponding to the cylinder 181, there are through areas 175 and 165 on the movable plate 170 and the base 160 respectively. With these through areas 175 and 165, the quartz glass rod 123a having the probe tip 110 can be moved in a vertical direction to measure a target sample being placed at the center of the bottom of the base 160.

In the beginning of operating of the long-stroke nanopositioning device 100, for example in the Z direction. The friction force exerted on the quartz glass rod 123a by the ceramic fixed seat 129a is adjusted to be greater than the friction force exerted on the quartz glass rod 123a by the ceramic fixed seat 127a. Then, a PZT actuator (not shown) applies an input voltage to the PZT tube 121a. As a result, the PZT tube 121a stretches and top end of PZT tube 121a has an upward displacement z0. Because the end of the PZT tube 121a is fixed to the movable plate 180 by the ceramic fixed seat 127a, a relative displacement z0 occurs between the ceramic fixed seat 127a and the quartz glass rod 123a accordingly. When the applying input voltage is rapidly terminated, the quartz glass rod 123a drops as a result of the retreat of the PZT tube 121a. The retreat of the PZT tube 121a and the weight of quartz glass rod 123a itself will cause a downward displacement z1 of the quartz glass rod 123a that is greater than z0. Thus, the total displacement of the quartz glass rod 123a during a voltage input/output period is z1−z0.

On the contrary, if the input voltage causes the PZT tube 121a to retreat downwards, the quartz glass rod 123a will have a downward displacement z2 by the ceramic fixed seat 129a fixed on the PZT tube 121a. Correspondingly, there is a relative downward displacement z2 between the ceramic fixed seat 127a and the quartz glass rod 123a. When the applying input voltage is rapidly terminated, the PZT tube 121a will expeditiously stretched upwards and cause the quartz glass rod 123a to have an upward displacement z3 that is greater than z2.

By adjusting the applying input voltage and the force exerted on the ruby balls by the spring 151, the total displacement of the quartz glass rod 123a of the present invention during a voltage input/output period can be changed. This embodiment is a long-stroke nanopositioning device that is applicable to the three-dimensional scanning with a large stroke of several millimeters and a high resolution of 0.1 nm.

Embodiment Two

Two-dimensional Long-stroke Nanopositioning Device

Figure 3:
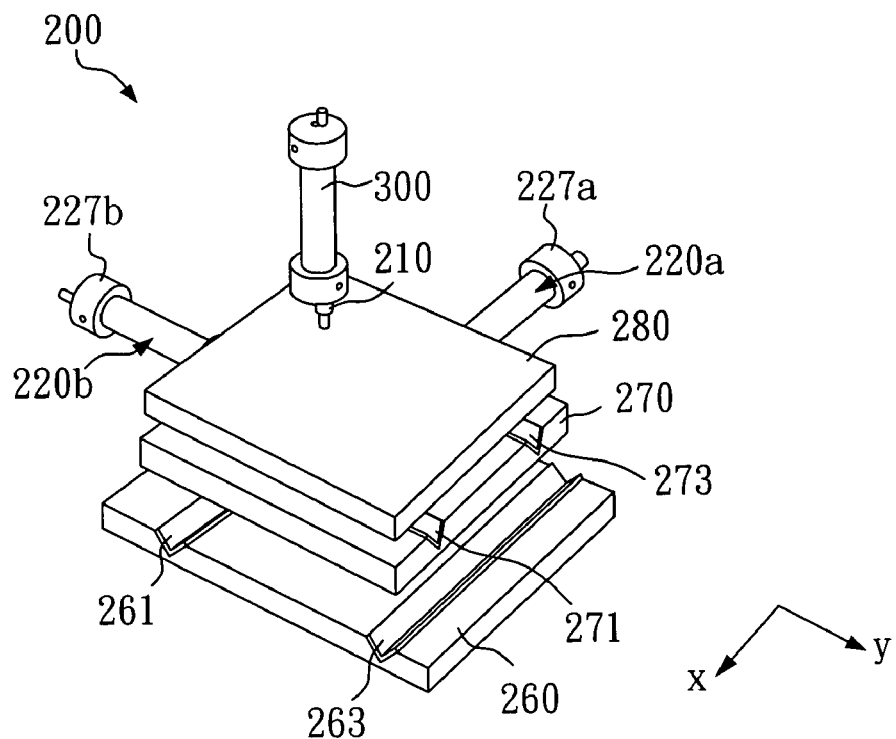
FIG. 3 is a schematic view of a preferred embodiment of a two-dimensional long-stroke nanopositioning device according to the present invention.

As shown in FIG. 3, the long-stroke nanopositioning device 200 of this embodiment comprises: the movable plate 280 that is capable of two-dimensional long-stroke nanometer scaled displacements and the nanopositioning unit 300 that is equipped with the STM probe tip 210. The nanopositioning unit 300 can be any conventional nanopositioning mechanism, such as a voltage-controlled piezoelectric element, a thermal-controlled piezoelectric element or a nanopositioning mechanism utilizing laser light path. The long-stroke nanopositioning device 200 has two nanopositioning units 220a and 220b in the X-axis and Y-axis directions, respectively. Each of these nanopositioning units has the same structures as those of the one shown in FIG. 2.

The long-stroke nanopositioning device 200 comprises: a base 260 and a movable plate 270. The base has V-shaped quartz glass guided grooves 261 and 263 along the X direction and the movable plate 270 is mounted on the base 260. The movable plate 270 is connected to a quartz glass rod of the nanopositioning unit 220a capable of displacements in the X direction. The nanopositioning unit 220a has a ceramic fixed seat 227a that is connected to a mass block (not shown) to fix the ceramic fixed seat 227a in position. The movable plate 270 has V-shaped quartz glass guided grooves 271 and 273 in the Y direction and the movable plate 280 is mounted on the movable plate 270. The movable plate 280 is connected to a quartz glass rod of the nanopositioning unit 220b capable of displacements in the Y direction. The nanopositioning unit 220b has a ceramic fixed seat 227b that is connected to a mass block (not shown) to fix the ceramic fixed seat 227b in position. A target sample to be detected can be placed on the movable plate 280.

By adjusting the applying input voltage and the force exerted on the ruby balls by the spring, the total displacements of the quartz glass rods of the long-stroke nanopositioning device 200 during a voltage input/output period can be changed, as described in the aforesaid preferred embodiment of the present invention.

Embodiment Three

Rotating Long-stroke Nanopositioning Device

Figure 4:
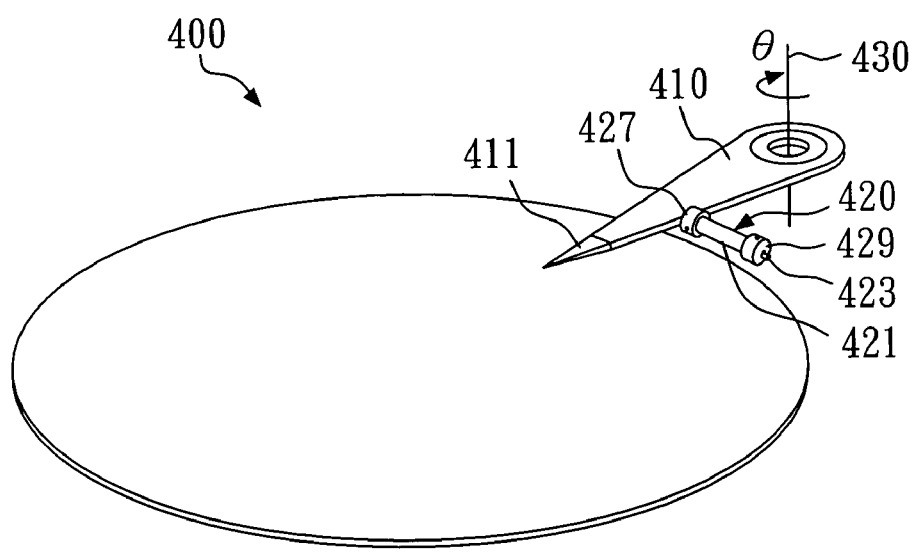
FIG. 4 is a schematic view of a preferred embodiment of a rotating long-stroke nanopositioning device according to the present invention.

As shown in FIG. 4, the long-stroke nanopositioning device 400 can overcome the drawbacks of the present nanopositioning mechanisms such as movements within a small range. A probe tip 411 is positioned on the supporting seat 410 which is disposed in a ceramic fixed seat 427 of the long-stroke nanopositioning device 400 with long stroke, nanometer scaled displacements. A nanopositioning unit 420 is assembled to a fixed quartz glass rod 423. The supporting seat 410 can be rotated around the shaft 430. The nanopositioning unit 420 of the embodiment is the same as that of aforesaid embodiment that is shown in FIG. 2. Thereofore, it will not be described again herein.

While the long-stroke nanopositioning device 400 of this embodiment is in operation, the quartz glass rod 423 is fixed in position. The nanopositioning unit 420 has relative displacements on the quartz glass rod 423 by the driving force from the deformation the PZT tube 421 and the friction force by the ruby balls. It will cause the supporting seat 410 to have displacements in the θ direction. At the beginning of the operation, the friction force exerted on the quartz glass rod 423 by the ceramic fixed seat 429 is adjusted to be greater than the friction force exerted on the quartz glass rod 423 by the ceramic fixed seat 427. Then, a PZT actuator (not shown) applies an input voltage to the PZT tube 421. For the reason that the friction force exerted on the quartz glass rod 423 by the ceramic fixed seat 429 is greater than the friction force exerted on the quartz glass rod 423 by the ceramic fixed seat 427. The end of the PZT tube 421 near the ceramic fixed seat 429 will be fixed while the other end of the PZT tube 421 will have displacements due to the voltage-induced, stretching deformation of the PZT tube 421. Therefore, if an input voltage causes the PZT tube 421 to extend a displacement of $\Delta\theta 1$ toward the −θ direction, the PZT tube 421 will expeditiously retreat toward the θ direction when the input voltage is terminated. That is, the nanopositioning unit 420 will have a displacement $\Delta\theta 2$ toward the θ direction that is greater than $\Delta\theta 1$ when the input voltage is rapidly terminated. Hence, the total displacement of the nanopositioning unit 420 during a voltage input/output period is $\Delta\theta 2 - \Delta\theta 1$. On the contrary, if the input voltage causes the PZT tube 421 to have a retraction of $\Delta\theta 3$ toward the θ direction, the PZT tube 421 will expeditiously extend in the −θ direction when the input voltage is terminated. That is, the nanopositioning unit 420 will have a displacement $\Delta\theta 4$ toward the −θ direction that is greater than $\Delta\theta 3$ when the input voltage is rapidly terminated. Hence, the total displacement of the nanopositioning unit 420 during a voltage input/output period is $\Delta\theta 4 - \Delta\theta 3$. By adjusting the applying input voltage and the force exerted on the ruby balls by the spring, the total displacements of the quartz glass rods of the long-stroke nanopositioning device 400 during a voltage input/output period can be changed.

It is known by the people skilled in the art, the operation of the long-stroke nanopositioning device of the present invention is not limited as described above.

It is apparent from the above embodiments that the nanopositioning device of the present invention is capable of providing nanometer scaled displacements in single-axial direction, two-axial direction, three-axial direction or rotatory direction. The nanopositioning device of the present invention not only overcomes the drawbacks of the commercial nanopositioning mechanisms of the present time, but also provides a long stroke, nanometer scaled displacement of a minute probe tip. Besides, due to its simple and less-complex structure, the manufacturing cost of the nanopositioning device of the present invention can be much lower than the commercial nanopositioning mechanisms of the present time.

Although the present invention has been explained in relation to its preferred embodiments, it is to be understood that many other possible modifications and variations can be made without departing from the spirit and scope of the invention as hereinafter claimed.

What is claimed is:

1. A long-stroke nanopositioning device, comprising:
   a piezoelectric tube;
   a rod penetrating said piezoelectric tube without contacting with said piezoelectric tube;
   two fixed seats connecting to two ends of said piezoelectric tube respectively, each of said fixed seats having at least one spring, a plurality of balls and a base with a plurality of fixing apertures, wherein each of said fixing apertures receives one said ball that is sandwiched between said rod and said spring, at least one said fixing apertures receives one said spring; said fixed seats grip said rod with said balls; and
   a piezoelectric actuator applying an input voltage to said piezoelectric tube to cause one said end of said piezoelectric tube to have a relative displacement in a direction along the axis of said rod.

2. The long-stroke nanopositioning device of claim 1, wherein said rod is a quartz glass rod.

3. The long-stroke nanopositioning device of claim 1, wherein said base of said fixed seat is a ceramic base.

4. The long-stroke nanopositioning device of claim 1, wherein said plurality of balls of said fixed seat are ruby balls.

5. The long-stroke nanopositioning device of claim 1, wherein said piezoelectric tube is made of lead zirconium titanate.

6. The long-stroke nanopositioning device of claim 1, wherein said piezoelectric tube is a cylindrical tube.

7. The long-stroke nanopositioning device of claim 1, wherein said long-stroke nanopositioning device further comprises a probe tip mounted on said fixed seats or said rod.

8. The long-stroke nanopositioning device of claim 1, wherein said plurality of balls in quantity is not less than three.

9. The long-stroke nanopositioning device of claim 8, wherein said balls are arranged outside said rod in a shape of triangle and said fixed seats has one said spring.

10. The long-stroke nanopositioning device of claim 1, wherein said long-stroke nanopositioning device further comprises a movable plate which is connected to said fixed seats or said rod.

11. The long-stroke nanopositioning device of claim 10, wherein said long-stroke nanopositioning device further comprises a base plate having a plurality of V-shaped quartz guided grooves for supporting said movable plate.

12. A fixed seat for long-stroke nanopositioning devices, in cooperation with a piezoelectric tube having two ends where said fixed seat is mounted on, a rod penetrating said piezoelectric tube and an actuator applying an input voltage to said piezoelectric tube, comprising:
   a base having a plurality of fixing apertures and at least one movable span, wherein said rod penetrating said base, said fixing apertures and said at least one movable aperture are at the side face of said base which is in contact with said rod;
   a plurality of balls being received in said plurality of fixing apertures and said at least one movable span respectively; and
   a least one spring being disposed in said movable span, and said ball is sandwiched between said at least one spring and said rod;
   wherein said rod is sandwiched among said plurality of balls and the gripping force of said plurality of balls on said rod is controlled by adjusting the elastic force of said spring.

13. The fixed seat of claim 12, wherein said base is a ceramic base.

14. The fixed seat of claim 12, wherein said plurality of balls are ruby balls.

15. The fixed seat of claim 12, wherein said piezoelectric tube is a cylindrical tube.

16. The fixed seat of claim 12, wherein said plurality of balls in quantity is not less than three.

17. The fixed seat of claim 16, wherein said balls are arranged outside said rod in a shape of triangle and said fixed seat has one said movable span.

18. The fixed seat of claim 12, wherein said at least one movable span penetrating said base, and by adjusting the position of a screw which is against said at least one spring on one end of said movable span, the volume of said movable span can be altered and the elastic force of said at least one spring can thus be controlled.

* * * * *